(12) United States Patent
Englbrecht et al.

(10) Patent No.: US 8,892,678 B2
(45) Date of Patent: Nov. 18, 2014

(54) WRITING OPERATING DATA INTO A PORTABLE DATA CARRIER

(75) Inventors: Erich Englbrecht, München (DE); Walter Hinz, Garching (DE); Thomas Palsherm, Aschheim (DE); Stephan Spitz, München (DE)

(73) Assignee: Giesecke & Devrient GmbH, Munich (DE)

( * ) Notice: Subject to any disclaimer, the term of this patent is extended or adjusted under 35 U.S.C. 154(b) by 634 days.

(21) Appl. No.: 12/744,826

(22) PCT Filed: Nov. 26, 2008

(86) PCT No.: PCT/EP2008/010041
§ 371 (c)(1),
(2), (4) Date: May 26, 2010

(87) PCT Pub. No.: WO2009/068272
PCT Pub. Date: Jun. 4, 2009

(65) Prior Publication Data
US 2010/0306338 A1    Dec. 2, 2010

(30) Foreign Application Priority Data
Nov. 27, 2007  (DE) .......................... 10 2007 057 001

(51) Int. Cl.
*G06F 15/167*    (2006.01)
*G07F 7/08*    (2006.01)
(Continued)

(52) U.S. Cl.
CPC ............ *H04L 29/1232* (2013.01); *G07F 7/084* (2013.01); *G06F 3/1231* (2013.01); *G07F 7/1008* (2013.01); *H04L 67/02* (2013.01); *H04L 61/6022* (2013.01); *G06Q 20/341* (2013.01); *G06Q 20/355* (2013.01); *H04L 61/2092* (2013.01); *G06Q 20/3552* (2013.01); *H04L 61/2007* (2013.01); *H04L 29/12254* (2013.01); *Y04S 50/12* (2013.01); *H04L 29/12839* (2013.01); *H04L 61/2038* (2013.01); *H04L 67/34* (2013.01); *H04L 29/12216* (2013.01)
USPC ............................ 709/213; 711/147; 711/148

(58) Field of Classification Search
CPC ....... G06K 7/00; G06K 7/10009; G07K 7/10; G07K 7/1008; G06K 19/0719; G11B 5/4969; G11B 7/007; G11B 20/00637; G11B 20/00644; G11B 20/00652
See application file for complete search history.

(56) References Cited

U.S. PATENT DOCUMENTS
6,402,028 B1    6/2002   Graham, Jr. et al.
6,519,251 B1 *  2/2003   Lim .............................. 370/352
(Continued)

FOREIGN PATENT DOCUMENTS
DE    102004006308 A1    9/2005
WO    9852161 A2    11/1998
(Continued)

OTHER PUBLICATIONS
Lu et al., "Network smart card review and analysis", Computer Networks, Apr. 29, 2007, pp. 2234-2248, vol. 51, No. 9, Elsevier Science Publishers 13.V., Amrsterdam, NL.
(Continued)

*Primary Examiner* — Jude Jean Gilles
*Assistant Examiner* — Jaren M Means
(74) *Attorney, Agent, or Firm* — Workman Nydegger

(57) ABSTRACT

In a method for writing (S9, S11) of operating data (6) through a writing system (1, 2) comprising a central station (1) and at least one distribution station (2) to a portable data carrier (3) connected with the at least one distribution station (2) within the framework of a production of the data carrier (3) there is generated (S4, S5) an individual addressing for the data carrier (3) connected with the at least one distribution station (2), via which addressing the data carrier (3) is uniquely addressable system-wide upon the writing (S9, S11) of the operating data (6). In doing so, at least a part of the system-wide unique individual addressing can be generated (S4, S5) by the data carrier (3) itself or by the distribution station (2) with which the data carrier (3) is connected.

25 Claims, 2 Drawing Sheets

(51) Int. Cl.
*G06F 3/12* (2006.01)
*G07F 7/10* (2006.01)
*H04L 29/08* (2006.01)
*H04L 29/12* (2006.01)
*G06Q 20/34* (2012.01)

(56) References Cited

U.S. PATENT DOCUMENTS

2002/0116485 A1* 8/2002 Black et al. .................. 709/223
2009/0236414 A1   9/2009 Finkenzeller et al.
2010/0058365 A1* 3/2010 DeFore et al. ................ 719/329

FOREIGN PATENT DOCUMENTS

| WO | 2005064889 A1 | 7/2005 | |
| WO | WO 2005064889 A1 * | 7/2005 | ............. H04L 29/06 |
| WO | 2007105120 A1 | 9/2007 | |
| WO | 2007124939 A1 | 11/2007 | |

OTHER PUBLICATIONS

International Search Report in PCT/EP2008/010041, May 18, 2009.
Search Report of German Patent Office relating to German Patent Application No. DE 10 2007 057 001.7, Jul. 28, 2008.

* cited by examiner

WRITING OPERATING DATA INTO A PORTABLE DATA CARRIER

FIELD OF THE INVENTION

The present invention relates to a method for writing operating data to a portable data carrier by means of a writing system when the data carrier is produced, such a portable data carrier, a writing system and a distribution station of the writing system.

BACKGROUND

Within the framework of the production of portable data carriers, such as e.g. chip cards, smart cards or the like, multiple operating data are written to the data carrier before issuing the data carriers to the respective end users. Thus for example when a data carrier is completed, the software-technical requirements are provided for its initialization, in which for a plurality of data carriers identical operating data, which are independent of the data carrier and independent of the person, are written to the data carrier (in the following the term "initialization" implies also the preparatory completion). In the subsequent personalization then person-individual operating data are written to the data carrier, e.g. individual identification features of the end user to whom the data carrier in question is to be issued.

Such operating data, which can comprise an operating system or at least parts of the operating system of the data carrier, can comprise several MBytes. Currently e.g. smart cards and chip cards are initialized and/or personalized via the common T=1 or T=0 communication protocol in accordance with ISO 7816 with the aid of ADPU communication units ("Application Data Protocol Units"). However, the transfer speed of the T=0/T=1 communication protocol is so low that an efficient initialization/personalization of a plurality of data carriers is impossible. Moreover, also a quasi-parallel initialization/personalization of data carriers is not supported by the T=0/T=1 communication protocol, since it is provided only for two-sided data communication between a portable data carrier and a writing/reading device.

Accordingly, it is the object of the present invention to enable an efficient writing of operating data during the production of a portable data carrier.

This object is achieved by a method for writing operating data to a portable data carrier, such a data carrier, a distribution station of a writing system and a writing system with the features of the independent claims.

According to the invention, in a method for writing operating data to a portable data carrier connected with a writing system within the framework of a production of the data carrier there is generated an individual addressing of the data carrier in question via which, upon writing of the operating data, the data carrier can be uniquely addressed writing-system-wide.

A corresponding writing system comprises a central station and at least one distribution station connected with the central station via a suitable communication network. With a distribution station in turn in each case several data carriers can be connected for writing operating data. The operating data to be written to a certain data carrier are transferred by the central station to that distribution station of the writing system with which the data carrier in question is connected, and are finally forwarded by the distribution station to the data carrier or written to it. In doing so, via the generated individual addressing the data carrier can be uniquely addressed system-wide by the central station and, if applicable, also by the corresponding distribution station. The individual addressing of a data carrier is thus uniquely attributed to the data carrier in question throughout the complete communication network formed by the writing system, independent of the size of the communication network, the number of communication devices connected with each other within the communication network or other such parameters. Since an individual addressing is unique (i.e. nonrecurring) system-wide, a simple design of the distribution stations is enabled, for, due to the addressings which are unique system-wide, said distribution stations do not need to carry out any address translating, re-addressing or similar address-arithmetic operations. Thereby also a writing of operating data to data carriers in larger (correspondingly secured) communication networks is enabled, e.g. in wide area networks extending over large geographic distances.

The process of generating a writing-system-wide unique individual addressing is designed in such a fashion that several data carriers connected simultaneously with a distribution station can be uniquely addressed system-wide by the writing system, i.e. in particular by the central station initiating the writing process, but preferably also by a distribution station, since the individual addressings respectively generated for the connected data carriers are pairwise different from each other and consequently no addressing conflicts can arise. Through the possibility of a system-wide unique individual addressing of each portable data carrier it is possible in particular to write similar or identical data to several portable data carriers (quasi-)simultaneously through concurrent processes, since these are distinguishable by the writing system at any time.

In this context a quasi-simultaneous writing of operating data in particular is to be understood as a multitasking method which enables a concurrent execution of individual parallel writing processes, in that the processes are activated alternately at such short intervals that the impression of simultaneousness is created. Moreover, a quasi-simultaneous writing can also be understood as a truly parallel writing of operating data, provided that the distribution station fulfills the corresponding requirements with regard to computer architecture.

In this way, through parallel writing of identical or similar operating data (i.e. initialization data or personalization data) to a plurality of identical or similar portable data carriers, the throughput of the initialization or personalization of portable data carriers can be increased, thus enabling an efficient production of data carriers. Furthermore, the space requirement of the initialization/personalization is reduced, since the simultaneous initialization/personalization of a plurality of data carriers requires space for only a small number of or for only one distribution station. Such a writing system can furthermore be extended almost as desired, since no addressing conflicts can occur.

The individual addressing here is preferably a multi-part addressing, providing several addresses for different layers of a used multi-layer communication protocol. Respectively one of these several addresses comprised by the individual addressing in total is suitable for the system-wide unique addressing of the data carrier via one of the protocol layers of the multi-layer communication protocol. According to the invention the individual addressing can be generated locally by the data carriers as well as centrally by a distribution station. Likewise it is possible that at least a part of the multi-part addressing is generated locally by a data carrier, preferably at least one of the several addresses for addressing the data carrier via the corresponding protocol layer of the used multi-layer communication protocol, and another part of the multi-part addressing is generated by the distribution station.

Correspondingly, both an inventive portable data carrier and an inventive distribution station comprise at least one memory, one interface device and one address generator which generates at least a part of an individual addressing by means of which the writing system, with which the data carrier is connected via its interface device, can uniquely address the data carrier system-wide and activate it.

For connecting a portable data carrier with a distribution station of the writing system a data carrier and a distribution station comprise respectively corresponding interface devices, wherein preferably several data carriers can be connected simultaneously via the interface device of a distribution station. Moreover, each data carrier or each distribution station preferably comprises a control device which controls the communication with the distribution station or with the data carriers and the generation, through the corresponding address generator, of an individual addressing or of the at least one part of the individual addressing to be generated by the data carrier or by the distribution station. Every address generator of a data carrier connected with a distribution station or of a distribution station correspondingly generates upon request by the corresponding control device the complete or at least a part of an individual addressing for the data carrier in question, which are pairwise different from all further individual addressings generated for further data carriers connected with the distribution station. The individual addressings or those parts of the individual addressings which are to be generated by a data carrier or a distribution station can be generated e.g. on the basis of random information or individual identifications of the data carriers which themselves are already pairwise different. A control device of a data carrier causes the associated address generator to generate a part of the individual addressing to be generated by the data carrier, e.g. when it registers the connecting of the data carrier with the writing system or with a distribution station of the writing system or receives a corresponding address request signal from the writing system. Likewise the control device of a distribution station causes its address generator to generate a part of the individual addressing to be generated by the distribution station, e.g. when the distribution station registers the connecting of one or several data carriers or receives a corresponding address request signal from the central station.

It is furthermore advantageous that not only pairwise different individual addressings are generated with regard to those data carriers which are respectively simultaneously connected with one or several distribution stations of the writing system, but also for as many as possible or even all of the portable data carriers which are ever initialized/personalized by the writing system in a time-shifted fashion, so that the individual addressings of all initialized/personalized data carriers are unique system-wide and consequently also remain permanently individual to the data carrier after the writing process.

It is furthermore advantageous in principle that the operating data are forwarded by the central station via the distribution stations to the data carriers in accordance with a uniform communication protocol, so as to permit the inventive writing-system-wide unique addressing consistently in this communication protocol. As such a consistent communication protocol the multi-layer TCP/IP protocol is particularly suitable. Therefore in each case a TCP/IP connection is established between the central station and the distribution stations, while, for the purpose of writing operating data, the distribution stations themselves preferably establish TCP/IP connections to all portable data carriers connected respectively via their interface devices. Correspondingly the individual addressings to be generated for the individual data carriers connected with the respective distribution station through a TCP/IP communication network in each case comprise at least a system-wide unique, data-carrier-individual IP address which is pairwise different at least with regard to all other data carriers connected with the writing system at this time.

The IP address can be generated entirely or partly both by the data carrier or the address generator of the data carrier and by a distribution station of the writing system or an address generator of said distribution station. In case the distribution station is equipped to generate IP addresses, it preferably generates an IP address centrally for each data carrier connected therewith. In case the IP addresses are generated in accordance with the IPv4 address convention, if applicable, an address translation takes place (NAT; "network address translation"), e.g. through the distribution station. However, in case the IP addresses are generated in accordance with the IPv6 address convention, an address translation is not necessary even if the writing system is embedded in a (possibly open) wide area network, since the IP addresses generated are then even globally unique.

Preferably as corresponding interface devices of the data carriers and a distribution station high-speed interfaces are used, in particular USB interfaces, which, as data link layer (protocol layer 2 of the ISO/OSI reference model), enable a network access for TCP/IP connections between a distribution station and the data carriers as network layer or transport layer (protocol layers 3 and 4 of the ISO/OSI reference model). A corresponding TCP/IP connection between the central station and a distribution station in contrast is preferably not based on USB connections, but is a conventional TCP/IP connection, e.g. based on an Ethernet (LAN) connection or the like. The IP data packets forming the operating data are then, via respectively consistent TCP/IP connections, sent by the central station to all distribution stations connected therewith, and forwarded by each distribution station to the data carriers respectively connected therewith, for writing to a memory provided for this purpose. Thus a system-wide uniform network data format is enabled, which consists of the IP addressing (protocol layer 3 of the ISO/OSI reference model) and the higher protocol layers based thereon.

The writing of data to the memory of the portable data carrier via a TCP/IP connection is supported by a control device of the data carrier and can take place via a USB high-speed interface at a high data rate (up to 12 MBit/s). With a corresponding USB interface device of the distribution station accordingly a plurality of data carriers can be connected, so that due to the combination of parallel connectivity and the high data rate of the USB interface operating data can be written quasi-simultaneously to a plurality of data carriers.

When a USB connection is used between a distribution station and a data carrier, it is in particular possible that a data carrier is connected with the distribution station via a network connection as an independent network device (and not as a passive, local USB device), so that operating data for initializing/personalizing the data carrier can be written to the data carriers in question via a suitable network operation. Such a network connection between the distribution station and a plurality of data carriers is supported e.g. by the USB standard within the framework of the Ethernet emulation module as a device class of its own (EEM/CDC) and is accordingly also supported by a control device of a data carrier. Via the USB connections between a distribution station and the data carriers thus Ethernet connections on the data link layer (protocol layer 2 of the ISO/OSI reference model) are emulated to the Internet or another suitable data communication network, via which the operating data can be written to the data carriers in question in accordance with the TCP/IP protocol. In this case an address generator of a data carrier or a distribution station, upon prompting by its control device, generates, in addition to the IP address, an individual MAC (Media Access Control) address for the data carrier in question, since the distribution station sends Ethernet packets and IP packets in accordance with different protocol layers to the MAC address and the IP address of the data carrier. The MAC address, insofar exactly like the IP address, represents a part of the individual addressing which can be generated by the data carrier or by its address generator, wherein the MAC address and the IP address can also be generated by different devices, e.g. the IP address by a distribution station and the MAC address by a data carrier.

Preferably the individual IP addresses or individual MAC addresses are chosen by an address generator from a corresponding IP address space or MAC address space respectively, said address space being predetermined for example by the associated control device in accordance with specifications by the central station. Whereas such a MAC address space is a range of MAC addresses allocated to the producer of the data carrier, from which he can allocate a MAC address to newly produced devices, the IP address space results from the used sub-network (e.g. in accordance with the IPv4 or IPv6 address convention).

A communication between the data carrier and the writing system before the generation of the individual addressings (i.e. before a TCP/IP data communication with logic addressing is possible) can take place on the level of the USB protocol via the USB connections to the distribution station in question. Since the USB interface devices (i.e. USB connections or USB ports) of the data carriers are distinguishable for a USB control (i.e. a USB controller) of the distribution station, the data carriers can also be activated individually via their USB connections even before an individual addressing is available. In this fashion the distribution station, if applicable, can send information about the predetermined address spaces to the data carrier or receive serial numbers of the data carriers. Likewise a distribution station can send a part of the individual addressing generated thereby via the USB connection to the data carrier (e.g. its IP address) or receive a part of the individual addressings generated by the data carrier (e.g. the MAC address) and allocate them to the data carrier via the distinguishable USB connections.

It is advantageous that an address generator chooses the respective IP addresses and MAC addresses from the corresponding address spaces, which are identical at least for all data carriers connected with the same distribution station, in a fashion that is as statistically equally distributed as possible, so that the IP addresses and MAC addresses allocated to the various data carriers preferably do not recur at all or do so only very rarely. This can be achieved for example in that an address generator generates the individual MAC address and/or IP address on the basis of a unique, preferably random or quasi-random identification of the data carrier, such as e.g. a preferably unique serial number or identification number of the data carrier, e.g. the ICCSN (Integrated Circuit Card Serial Number) of the data carrier. It is likewise possible to generate IP and/or MAC addresses on the basis of a random process which is e.g. provided by a random generator. This preferably optimal use of an available address space then in particular results in the address generator generating not only IP addresses and/or MAC addresses which are unique and individual with regard to the data carriers connected parallel with the distribution station at the time in question, but in the generation of even such IP addresses and/or MAC addresses which are unique and individual to (preferably) all data carriers (ever) written by the writing system. Accordingly it is advantageous that, even in the case of a restart of the data carrier (or of the distribution station), an address generator generates MAC addresses and/or IP addresses which were not used before, although the serial number of the data carrier has not changed. This can be achieved for example by additionally using a random number in the addressing.

Preferably the distribution station authenticates itself in each case vis-à-vis the data carrier or its control device before the data are written to the memory of the data carrier. In this fashion the control device of a data carrier enables a writing of e.g. security-relevant operating data within the framework of an initialization/personalization of the data carrier only provided that a trustworthy and/or authorized distribution station or a distribution station of a trustworthy and/or authorized writing system is/are given.

In preferred embodiments an individual addressing for the data carrier is generated only for a first operation mode of the data carrier, whereas in a second operation mode a fixed, predetermined address is used. The fixed address can be uniform for a group of data carriers. Consequently it is possible in particular during the personalization phase to use an individual addressing with the aid of the first operation mode and a uniform address in the second operation mode. An irreversible switching of the portable data carrier from the first to the second operation mode preferably can take place after the end of the personalization phase.

Although the inventive method is in principle suitable for writing any data to any portable data carriers or for initializing and/or personalizing any portable data carriers or, upon producing portable data carriers, writing other operating data to them, it is particularly preferred to initialize and/or personalize chip cards (USB chip cards) equipped with a USB interface through a writing system in accordance with the described method.

BRIEF DESCRIPTION OF THE DRAWINGS

Further advantages of the invention will result from the following description of different inventive embodiments and alternatives. Reference is made to the following figures, which show.

DETAILED DESCRIPTION OF VARIOUS EMBODIMENTS

Figure 1:
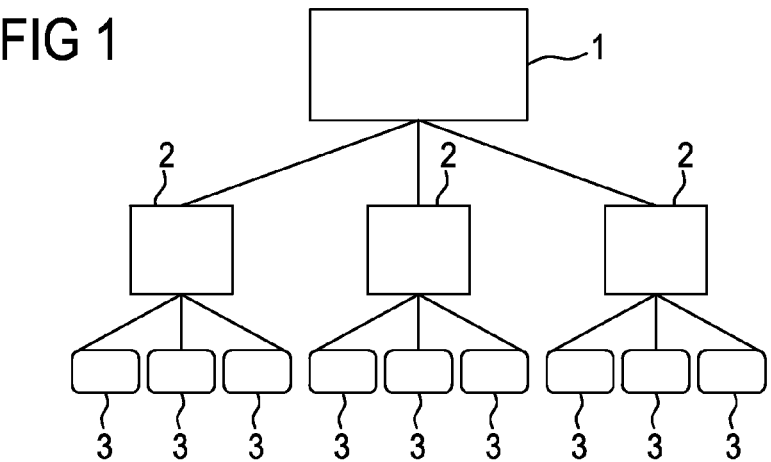
FIG. 1 a schematic overview of an initialization/personalization system, consisting of a central station, distribution stations as well several data carriers.

FIG. 1 shows an initialization/personalization system consisting of a central station 1 and, connected with the central station 1, several distribution stations 2 with which respectively a plurality of chip cards 3 is connected. The chip cards 3 are initialized/personalized by the initialization/personalization system (in the following referred to as "writing system"), in that initialization/personalization data (in the following referred to as "operating data") are transferred by the central station 1 to the distribution stations 2 and are forwarded by the distribution stations 2 to the data carriers 3 respectively connected with them. The writing system of FIG. 1 can, depending on the type of data communication connections between the central station 1 and the distribution stations 2, be configured both as a local area network (LAN) and as a wide area network (WAN) with a central station 1 and distributed (local) distribution stations 2.

Figure 2:
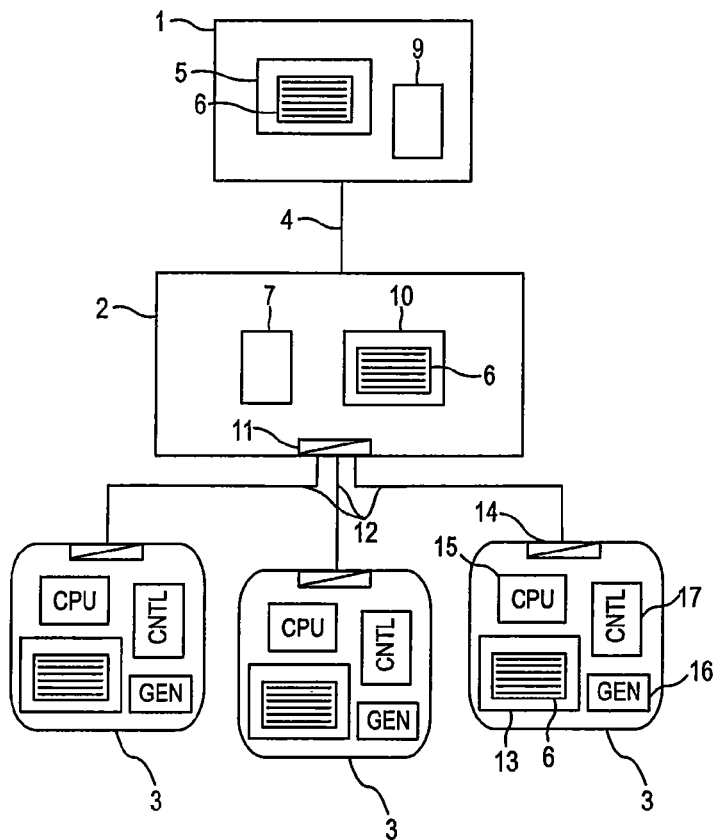
FIG. 2 data carriers which are connected with a distribution station of a writing system and which respectively generate their own individual addressings.
Figure 3:
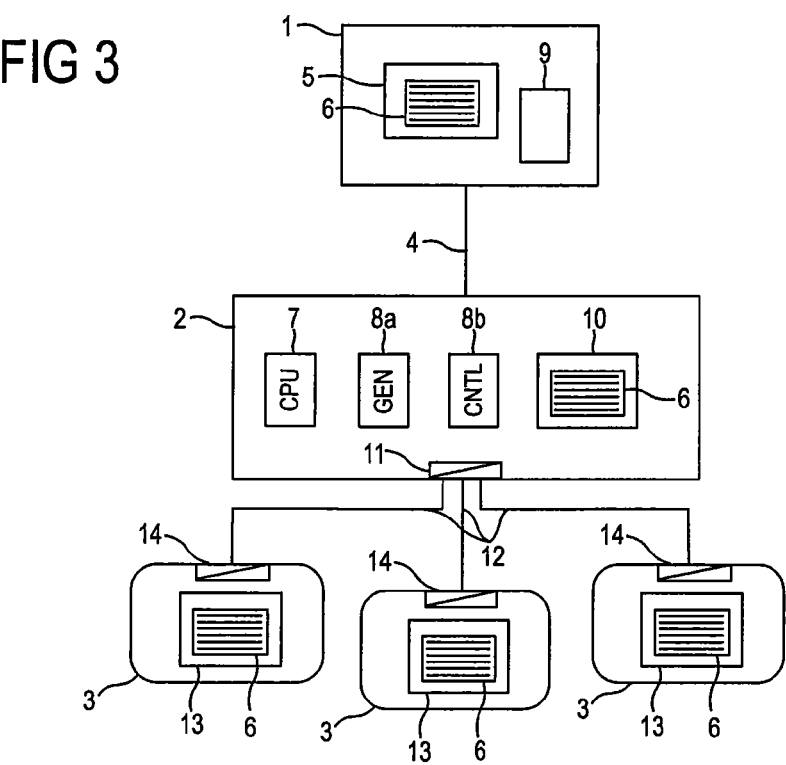
FIG. 3 a distribution station which is connected with a central station and data carriers and which generates the individual addressings of the data carriers.

To the distribution stations 2 shown in FIGS. 1, 2 and 3 respectively several chip cards 3 to be provided with operating data 6 in the form of initialization/personalization data can be connected via corresponding interface devices 11. In this fashion the chip cards 3 to be initialized and/or personalized can be distributed to the individual distribution stations 2 controlled by the central station 1 in accordance with requirements relating to manufacturing or data processing. Accordingly, the writing system is preferably integrated in the other production steps of an apparatus for producing chip cards 3.

Initialization data are to be understood here as data-carrier independent data which are used for initializing the chip cards 3, i.e. in particular the operating system or at least parts of the operating system as well as data-carrier independent applications, administrative data or the like, such as e.g. the completion data which are also implied by the term initialization data in the context of the present invention. In contrast, personalization data are person-individual data which establish an allocation between a chip card 3 and the end user for whom the chip card 3 is intended. Personalization data can be e.g. identifying information, such as e.g. name, address or the like. The writing system sketched in FIG. 1 can insofar be used both by a chip-card producer in such a fashion that it is integrated in the chip-card production process, and by a chip-card issuer (e.g. a bank or the like) who personalizes already initialized, completed chip cards 3 and forwards them to his end customers.

FIGS. 2 and 3 respectively show such a writing system with a central station 1 and a distribution station 2 and connected data carriers 3 in greater detail. The central station 1 comprises a memory 5 in which a chip-card producer and/or chip-card issuer stores the operating data 6 to be written to the chip cards 3. The central station 1 furthermore comprises a writing device 9 which transfers the operating data 6 in accordance with predetermined criteria via a data communication connection 4 to the distribution stations 2, which, if applicable, intermediately store the operating data 6 in a memory 10 and finally forward them via data communication connections 12 to the chip cards 3 and write them to the memories 13 provided for this purpose. In the embodiments described in the following the writing device 9 of the central station 1 preferably initiates and controls the writing process, whereas the distribution stations 2 have a merely executing function and write the operating data 6 to the chip cards 3 indicated by the writing device 9 upon command by the writing device 9. Therefore at least the central station 1 must be in a position to uniquely address the data carriers 3 system-wide. Alternatively it is also possible that the central station 1 transfers the operating data 6 to the distribution stations 2, which then carry out the writing process to the respectively connected data carriers 3 largely independently.

The data communication connection 4 between the central station 1 and the distribution stations 2 can be provided via any data communication network and is preferably a TCP/IP connection e.g. via the Internet. The data communication connection 4 is preferably cryptographically or otherwise secured against manipulation and spying. In addition to a corresponding interface for the data communication connection 4 each individual distribution station 2 has a USB interface device 11 via which a plurality of chip cards 3 can be connected with the respective distribution station 2, so that the operating data 6 are written to the memory 13 of the chip card 3 in question via the USB connections 12 with corresponding USB interfaces 14 of the chip cards 3.

A distribution station 2 can be a conventional personal computer or other computer. Preferably the distribution station 2 is an embedded system, which is for example integrated in a production apparatus for chip cards 3 or the like. Insofar the distribution station 2 is equipped with the usual components of a computer, such as e.g. a processor 7 (CPU), a device (not shown) for forwarding operating data to the connected data carriers 3 as well as optionally with a memory 10. Via the USB interface device 11 of the distribution station 2 a plurality of chip cards 3 to be initialized/personalized can be connected in parallel with the distribution station 2.

These chip cards 3 are preferably identical or at least similar and are initialized/personalized simultaneously or at least quasi-simultaneously. They comprise in each case a corresponding USB interface device 14 for establishing a USB connection 12 as data link layer (protocol layer 2 of the ISO/OSI reference model) to the respective distribution station 2, a processor 15 (CPU), a nonvolatile memory 13 for accommodating the operating data 6, e.g. in an EEPROM memory, flash memory, FeRAM memory or MARAM memory, as well as further conventional components, such as e.g. a RAM working memory and a ROM memory (not shown).

Based on the USB connections 12 between distribution station 2 and chip cards 3 and on a conventional Ethernet/LAN connection 4 between central station 1 and distribution station 2 a consistent TCP/IP connection is established between the central station 1 and the chip cards 3 via which these can be initialized/personalized through the central station 1. The operating data 6 are consequently transferred in the form of IP data packets via the consistent TCP/IP connection from the central station 1 or its writing device 9 through the medium of the distribution station 2 to the chip card 3 in question. For this purpose the central station 1 uses a writing-system-wide uniform individual addressing of each chip card 3, said addressing comprising at least one system-wide unique IP address and one system-wide unique MAC (media access control) address, since the chip card 3 receives IP packets via the IP address (protocol layer 3 of the ISO/OSI reference model) and Ethernet packets via the MAC address (protocol layer 2 of the ISO/OSI reference model).

In accordance with the used multi-layer TCP/IP communication protocol the individual addressing of the chip card 3 is also a multi-part addressing which provides addresses for different protocol layers of the communication protocol. These addresses forming the individual addressing are respectively pairwise different and system-wide unique at least with regard to the chip cards 3 simultaneously connected with the distribution station 2 via the USB interface 11 at a certain time, preferably even the addresses of all chip cards 3 processed by the writing system over a longer period of time are pairwise different, so that addressing conflicts can be fundamentally prevented.

The IP address or the MAC address can be generated both by the chip card 3 in question and by the distribution station 2. FIG. 2 illustrates the case that the chip card 3 generates an IP address and a MAC address for itself, whereas FIG. 3 illustrates the case that the distribution station 2 generates an IP address and a MAC address for a connected chip card 3.

Additionally, also the (not illustrated) case exists that respectively one part of the individual addressing (e.g. respectively one address) is generated by the chip card 3 and the distribution station 2.

For generating at least a part of the individual addressing and for controlling the writing, the chip cards 3 shown in FIG. 2 each comprise a control device 17 (CNTL) and an address generator 16 (GEN) activatable through the control device 17. Preferably the control device 17 and the address generator 16 are configured as software components of the chip card 3 executable on the processor. The address generator 16 comprises a random number generator or can use a random generator present on the chip card 3 anyway, with said random number generator, as the basis for generating an individual addressing, providing a random number for the address generator 16 by means of a preferably uniformly distributed stochastic process. The IP address and/or the MAC address of the chip card 3 in question is then formed by the address generator 16 by means of a mapping of the random number to the address space respectively available for such addresses, with different random numbers preferably not being mapped to identical addressings. In this fashion it can be largely ruled out that addressings recur and lead to address conflicts.

The address space is preferably identical for each chip card 3 and is predetermined for the control device 17 through the distribution station 2 or the central station 1. This communication between the distribution station 2 and a chip card 3 takes place via the USB connection 12 on the level of the USB protocol, in that the respective physical USB connections 11, 14 (and not the logical devices in question) are activated through corresponding signals. In this fashion also the part of the individual addressing generated by an address generator 16 is transferred from the respective control device 17 via the USB connection 12 to the distribution station 2 or is requested or retrieved by it.

FIG. 3 shows a distribution station 2 which in addition to the components described in connection with FIG. 2 has a control device 8b (CNTL), which coordinates the writing process initiated by the writing device 9 of the central station 1 in that it receives operating data 6 from the central station 1 via the data communication connection 4 and forwards them to the chip cards 3. For generating a part of the individual addressings of the chip cards 3 respectively connected via the USB interface device 11 the distribution station 2 comprises an address generator 8a (GEN), which generates MAC addresses and/or IP addresses that are unique throughout the system, e.g. based on a random number. Furthermore the address generator 8a of the distribution station 2 can be configured in the same fashion as described above in connection with the address generator 16 of the chip cards 3.

Figure 4:
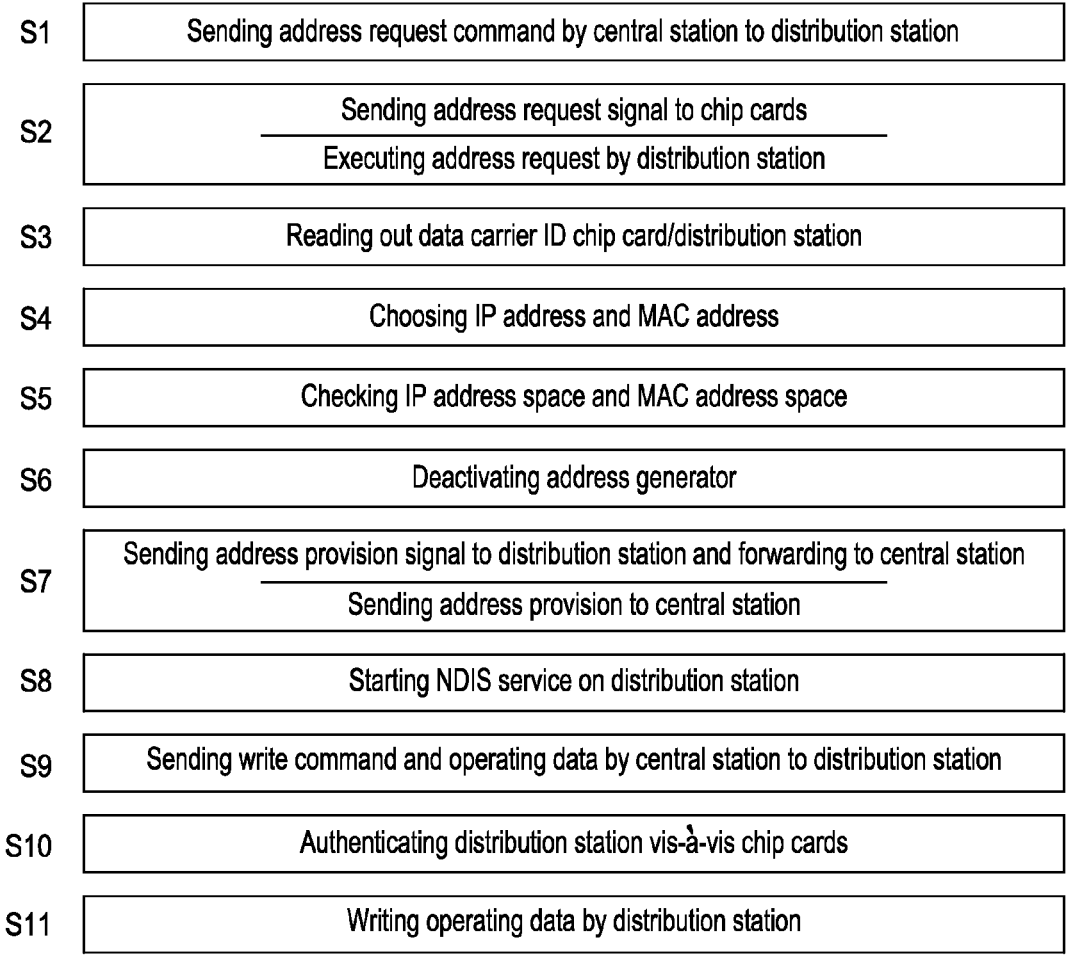
FIG. 4 a flow chart for writing operating data to a data carrier as network device.

FIG. 4 shows a flow chart of a method in which chip cards 3 can be activated by the distribution station 2 as network devices via an (emulated) Ethernet network connection. For the purpose of writing the operating data 6 to a memory 13 of a chip card 3 through the central station 1 a consistent TCP/IP connection is established between the central station 1 and the chip card 3 via the distribution station 2, in order to write the operating data 6 in accordance with the TCP/IP protocol. The TCP/IP connection via the communication connection 4 between the central station 1 and the distribution station 2 here is based on an Ethernet-LAN connection, whereas the TCP/IP connection via the USB connection 12 between the distribution station 2 and the chip cards 3 is based on an emulated Ethernet connection, which is supported by the USB standard within the framework of the Ethernet emulation module as a device class of its own (EEM/CDC).

FIG. 4 takes account of the two alternative embodiments of generating the individual addressings by each individual chip card 3 (according to FIG. 2) and in a centralized fashion by the distribution station 2 (according to FIG. 3). The two process variants are made clear in the process steps in question S2, S3 and S7 by means of horizontal or vertical lines. Moreover, there exists the third process variant in which the individual addressings are generated respectively partially by the distribution station 2 and a chip card 3. This is for example the case when the IP addresses are generated centrally by the distribution station 2 and the MAC addresses are generated locally by the individual chip cards 3. However, a detailed description of such a hybrid solution can be dispensed with, since it is immediately obvious from the individual steps of the method illustrated in FIG. 4 which concern the distribution station 2 or the chip cards 3. The preparatory and coordinating communication required for this purpose between the distribution station 2 and a chip card 3 is carried out via the USB connection 12 on the level of the USB protocol.

In step S1 an address request command is sent by the writing device 9 of the central station 1 via the data communication connection 4 to the distribution station 2, prompting the generation of individual addressings of the connected chip cards 3. In doing so, the address request command is sent to the distribution station 2 via the data communication connection 4 in accordance with a multi-layer communication protocol, preferably according to the TCP/IP protocol. The address request command of the writing device 9 either causes the distribution station 2 to direct an address request signal to the chip cards 3, so that these generate their individual addressings. Alternatively the address request command can comprise an address request directed to the distribution station to generate the individual addressings of all chip cards 3 connected with the distribution station 2. The distribution station 2 subsequently prepares the execution of the received address request command.

For this purpose the distribution station 2, for the case that the individual addressings are to be generated by the chip cards 3, in step S2 sends an address request signal via the USB connections 12 to each of the connected chip cards 3 or their control devices 17 and thereby initiates the generation of the respective individual addressings through the individual address generators 16 of the chip cards 3 in question (see FIG. 2). Since at this time no TCP/IP communication with logical addressing has been established yet via the USB connections 12, the address request signal takes place on the level of the USB protocol via the USB connection 12, since a USB controller (not shown) of the distribution station 2 can activate the individual USB connections 14 of the chip cards 3 via physical connection addresses. In contrast in step S2, for the case that the write command of the central station 1 comprises an address request directed to the distribution station 2, said address request is executed by the control device 8b and the address generator 8a of the distribution station 2 (see FIG. 3).

In step S3 the control device 17 of a chip card 3 or the control device 8b of the distribution station 2 reacts to the address request by the central station 1 in that a feature identifying the chip card 3 in question is read out by the corresponding address generator 16 or 8a as a basis for generating an individual addressing. If applicable, this serial number is read out from the chip card memory in question by the distribution station 2 on the level of the USB protocol, under the condition that it is provided that the distribution station 2 generates part of or the complete individual addressings of the connected chip cards 3.

The chip-card identifying features in principle fulfill the same requirements as the random numbers of a random generator mentioned in connection with the FIGS. 2 and 3. The individual identifying features can be any chip card identifications, preferably a serial number that can be read out from a serial number register (0x000f0004 and 0x000f0008) of a chip card 3. Such a unique chip card identification can for example be the ICCSN (Integrated Circuit Card Serial Number) of the chip card 3.

For connecting the chip cards 3 as network devices via the USB connections 12 the USB standard, with the Ethernet emulation module (EEM) as device class (class definition for communication devices; CDC), offers the possibility to establish an Ethernet network via the USB interface devices 11, 14. The EEM here carries out an encapsulation of Ethernet data blocks for transport via the USB connections 12. For this purpose the MAC (Media Access Control) addresses of the individual chip cards 3 are used for addressing via the emulated Ethernet connections 12.

In steps S4 and S5 through the address generator 16 or 8a activated by the control device 17 or 8b an individual IP address and an individual MAC address are computed on the basis of the previously read out chip card identification, which together form the multi-part individual addressing of the chip card 3 in question according to the used multi-layer communication protocol. Whereas the MAC address is required so that the distribution station 2 can send Ethernet packets to the chip card 3 on the protocol layer 2 of the ISO/OSI reference model, the IP address serves to send IP operating data packets to a chip card 3 in the present IP sub-network on the protocol layer 3 of the ISO/OSI reference model. The IP address insofar is not bound to the device in question physically, but merely logically. The IP addresses of the chip cards 3 can be generated both locally by the individual chip cards 3 and centrally by the distribution station 2, whereas the IP address of the distribution station 2 itself, unless it functions as a router merely forwarding operating data packets from the central station 1 to the chip cards 3, can be configured for example by means of a DHCP server (Dynamic Host Configuration Protocol).

In the case that the IP addresses are generated by the distribution station 2 and the MAC addresses are generated by the individual chip cards 3, the two addresses are joined for the purpose of forming an individual addressing which is suitable for addressing in accordance with the used multi-layer communication protocol by a corresponding communication on the level of the USB protocol via the USB connection 12.

The MAC address and the IP address for this purpose are chosen by the address generator 16 or 8a in such a fashion that they lie within an available MAC address space or IP address space (step S5). Corresponding information about the predetermined MAC- or IP address space, if applicable, is sent by the central station 1 via the TCP/IP connection 4 to the distribution station 2 and from this to the control device 17 of the chip card 3 (e.g. within the framework of the address request signal in step S2) or is provided to its own control device 8b for use.

The MAC address space is a contingent of reserved addresses, e.g. 00 90 D3 xx xx xx, allocated to the chip card producer in question. In contrast, the unique IP address is chosen from an IP address space of a local sub-network which is used for the initialization/personalization of the chip cards 3. In doing so, the address generator 16 or 8a in steps S4 and S5 chooses the MAC address and/or the IP address preferably in such a (statistically equally distributed) fashion that the full MAC address space and/or the full IP address space is used, before a MAC address and/or IP address which was already assigned for a chip card identification before is assigned again.

Subsequently the address generator 16 or 8a can be deactivated by the control device 17 or 8b in step S6. Provided that the individual addressing (or only the MAC address) was generated by the individual chip cards 3, said addressing is transferred in step S7 from the control device 17 of the chip card 3 via the USB connection 12 to the distribution station 2 in the form of an address provision signal responding to the address request signal (step S2). The distribution station 2 forwards the individual addressings of all chip cards 3 arriving in this fashion to the central station 1 and in particular to its writing device 9. Provided that the individual addressing (or only the IP address) was generated by the distribution station 2, said IP address is sent to the chip card 3 in question and the central station 1. In each case the writing device 9 of the central station 1 is thereby put in a position to carry out the writing (steps S9 to S11) of the operating data 6 to the memories 13 of the chip card 3, since the chip cards 3 can now be uniquely logically addressed system-wide by the central station 1 via the generated addressings within the framework of a consistent TCP/IP connection 4, 12.

For establishing this consistent TCP/IP connection 4, 12 in step S8 an NDIS service (Network Driver Interface Specification) is started on the distribution station 2 which is configured as an embedded system, said service forming a logical interface between the emulated Ethernet connection with MAC addressing on the data link layer (protocol layer 2 of the ISO/OSI reference model) and the TCP/IP data communication with IP addressing on the network layer (protocol layer 3 of the ISO/OSI reference model) based thereon.

In step S9 the operating data 6 to be written are sent in the form of IP data packets from the writing device 9 of the central station 1 via the data communication connection 4 to the distribution station 2 together with a write command prompting the distribution station 2 to write the operating data 6 to the memories 13 of the connected chip cards 3. In doing so, the write command can predetermine for the distribution station 2 the individual addresses of the chip cards 3 in question to which the operating data 6 are to be written.

In step S10 the distribution station 2 authenticates itself vis-à-vis the chip cards 3 to which the operating data 6 are to be written. Thereby the chip card 3 ensures that the distribution station 2 is authorized to write data to the chip card 3. The authentication can for example be a cryptographic authentication, a PIN check or a certificate check.

Finally in step S11 the operating data 6 are written to the memories 13 of the respectively individually addressable chip cards 3 through the writing device 9, in that the write command is executed by the distribution station 2. In the simplest case the write command is executed by the distribution station 2 in that the received operating data 6 are merely forwarded to the individual addressing mentioned in the write command. The write command then comprises all information which is essential for the writing process. In doing so, the distribution station can in particular function as a router which does not have an IP address of its own and merely forwards the operating data 6 according to instructions. Alternatively, also an active execution of the write command by the distribution station 2 can be provided, for example in that the distribution station 2 independently addresses the chip cards in question via their IP addresses and/or MAC addresses and does not only take over the addressings predetermined by the central station 1. In any case such writing processes can be carried out quasi-simultaneously by the operating system (not shown) of the distribution station 2, in that the individual writing processes are executed concurrently by a multitasking operating system.

Of course the succession of steps mentioned in FIG. 4 is not the only possibility of realizing the inventive method. Rather, also other successions of steps are conceivable and possibly required. For example the deactivation of an address generator (step S6) can also take place directly before or after the writing of the operating data 6 (step S11). Likewise, the installation of the NDIS service (step S8) and the sending of the operating data (step S9) are interchangeable.

It is furthermore conceivable that the writing process does not consist, as illustrated in FIG. 4, of separate address request—(steps S1 to S7) and writing phases (steps S8 to S11), but that these two central successions of steps are interlocked. For example initially a write command, the operating data and an address request can be sent to the distribution station 2 simultaneously, so that after the generation of the individual addressings the distribution station 2 independently writes the operating data to the chip cards 3 in question without further communication with the central station 1.

In any case the method according to FIG. 4 is not limited to USB chip cards, but can be applied to any portable data carriers and any data communication connections between a distribution station 2 and portable data carriers 3.

The invention claimed is:

1. A method within a framework of a production of a plurality of data carriers, the method comprising the steps:
    writing operating data to at least one portable data carrier within the framework of the production of the plurality of portable data carriers with a writing system, the writing system comprising a central station and a plurality of independently separate distribution stations, each of said distribution stations connected with the central station, wherein the at least one portable data carrier is connected using a physical connection to one distribution station of the plurality of distribution stations,
    wherein writing operating data includes sending the operating data by the central station to the data carrier via one of the distribution stations;
    generating for the data carrier an individual addressing via which the data carrier is uniquely addressable writing-system-wide upon the writing of the operating data, wherein the individual address is consistently used for forwarding the operating data from the central station to the one of the distribution stations and from the one of the distribution stations to the data carrier; and
    issuing the portable data carrier after operating data has been written to the portable data carrier.

2. The method according to claim 1, wherein for each of the plurality of data carriers connected with at least one distribution station of the writing system there is generated an individual addressing, which is pairwise different from all other individual addressings generated for the plurality of data carriers, and the operating data are written substantially simultaneously to the plurality of data carriers through addressing each of the plurality of data carriers by its individual addressing through the central station.

3. The method according to claim 1, wherein an individual addressing comprising at least two addresses generated for the writing-system-wide unique addressing of the data carrier in accordance with a multi-layer communication protocol, with each of the at least two addresses of the individual addressing being suitable for the writing-system-wide unique addressing of the data carrier via respectively one protocol layer of the multi-layer communication protocol, and being generated by the data carrier or by the distribution station.

4. The method according to claim 1, wherein for the writing-system-wide unique addressing of the data carrier via a consistent TCP/IP connection in accordance with the TCP/IP communication protocol between the central station and the data carrier there is generated an individual addressing comprising at least one writing-system-wide unique, data-carrier-individual IP address of the data carrier.

5. The method according to claim 4, wherein the IP address of the data carrier is generated on the basis of an individual identifying feature of the data carrier or on the basis of a random number.

6. The method according to claim 4, wherein the IP address is chosen from a predetermined IP address space in such an equally distributed fashion that it recurs as rarely as possible.

7. The method according to claim 4, wherein the IP address is generated by the data carrier and is transferred at least to the distribution station with which the data carrier is connected.

8. The method according to claim 4, wherein the IP address is generated by the distribution station with which the data carrier is connected, and is transferred at least to the central station.

9. The method according to claim 4, wherein a consistent TCP/IP connection is established from the central station via the distribution station to the data carrier and the operating data are written to the data carrier by the central station by means of the generated individual addressing via the distribution station by means of a network operation in accordance with the TCP/IP protocol.

10. The method according to claim 1, wherein a USB connection is established between the distribution station and the data carrier, and the operating data are sent from the central station to the distribution station and are written by the distribution station via the USB connection to a memory of the data carrier.

11. The method according to claim 10, wherein an individual addressing is generated which comprises at least one writing-system-wide unique, data-carrier-individual MAC address of the data carrier, via which the data carrier is uniquely addressable by the distribution station via the USB connection.

12. The method according to claim 10, wherein the MAC address of the data carrier is in each case chosen from a respectively predetermined MAC address space in such an equally distributed fashion that it recurs as rarely as possible.

13. The method according to claim 10, wherein the MAC address is generated respectively on the basis of an individual identifying feature of the data carrier or based on a random number.

14. The method according to claim 11, wherein the MAC address is generated by the data carrier and transferred to the distribution station with which the data carrier is connected.

15. The method according to claim 11, wherein the MAC address is generated by the distribution station with which the data carrier is connected and is transferred at least to the central station.

16. The method according to claim 1, wherein the individual address is used in a first operation mode of the data carrier and in a second operation mode of the data carrier an address is used which is uniform for a plurality of data carriers.

17. The method according to claim 16, wherein the data carrier is adapted to switch irreversibly between the first and the second operation mode.

18. A portable data carrier, comprising:
a processor,
a memory and
an interface device, and
further comprising an address generator which is arranged to generate at least a part of an individual addressing via which addressing the data carrier is uniquely addressable system-wide by a writing system connected with the data carrier via the interface device upon the writing of operating data to the memory within a framework of a production of the data carrier,
said portable data carrier being configured to receive operating data from a central station via at least one of a plurality of independently separate distribution stations,
wherein the data carrier is adapted to use the individual address in a first operation mode of the data carrier and to use in a second operation mode of the data carrier an address which is uniform for a plurality of data carriers.

19. The data carrier according to claim 18, wherein the address generator is arranged to generate at least a part of an individual addressing which is pairwise different from further individual addressings respectively generated for further data carriers connected with the writing system.

20. The data carrier according to claim 18, including a control device arranged so as to enable writing of the operating data to the memory through a writing system, with the address generator and the control device furthermore being arranged so as to enable a generation of at least a part of an individual addressing and writing of the operating data to the memory through the writing system by means of the generated writing-system-wide unique individual addressing.

21. The data carrier according to claim 18, wherein the data carrier comprises a chip card, smart card, cellular phone card or secure multimedia card.

22. A distribution station in a writing system comprising:
a central station; and
a plurality of independently separate distribution stations configured to forward operating data which are written by the central station to a portable data carrier connected with one of the distribution stations within a framework of a production of the data carrier, the portable data carrier comprising at least a processor, a memory, and an interface device, and the portable data carrier further comprising an address generator arranged to generate at least a part of an individual addressing via which the data carrier connected with the distribution station via the interface device is uniquely addressable system-wide upon the writing of operating data, wherein the individual address is consistently used for forwarding the operating data from the central station to the one of the distribution stations and from the one of the distribution stations to the data carrier,
said portable data carrier being configured to receive operating data from a central station via at least one of a plurality of independently separate distribution stations.

23. The distribution station according to claim 22, including a control device arranged so as to enable writing of the operating data to the memory through the central station, with the address generator and the control device furthermore being arranged so as to enable a generation of at least a part of the individual addressing and a writing of the operating data to the memory of the data carrier through the central station by the generated writing-system-wide unique individual addressing.

24. A writing system for writing operating data to portable data carriers within a framework of a production of the data carriers, the writing system comprising:
a central station configured to write operating data to the portable data carriers within the framework of the production of the data carrier; and
a plurality of independently separate distribution stations,
wherein a portable data carrier is physically connectable to one of the distribution stations, either or both the data carrier and the one distribution station being configured to generate at least a part of a system-wide unique individual addressing of the data carrier, and
wherein the central station and the distribution stations are configured to write operating data to the data carrier by the generated writing-system-wide unique individual addressing, and
wherein the individual address is consistently used for forwarding the operating data from the central station to the one of the distribution stations and from the one of the distribution stations to the data carrier.

25. The method according to claim 1, further comprising the step connecting multiple portable data carriers of the plurality of data carriers to the same distribution station.

* * * * *